(12) United States Patent
Liu et al.

(10) Patent No.: US 9,971,219 B1
(45) Date of Patent: May 15, 2018

(54) ARRAY SUBSTRATE, COLOR FILTER SUBSTRATE AND DISPLAY PANEL

(71) Applicants: BOE Technology Group Co., Ltd., Beijing (CN); Beijing BOE Display Technology Co., Ltd., Beijing (CN)

(72) Inventors: Deqiang Liu, Beijing (CN); Feifei Wang, Beijing (CN); Zhihua Sun, Beijing (CN); Yujie Gao, Beijing (CN); Honglin Zhang, Beijing (CN); Hebin Zhao, Beijing (CN)

(73) Assignees: BOE TECHNOLOGY GROUP CO., LTD., Beijing (CN); BEIJING BOE DISPALY TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/704,170

(22) Filed: Sep. 14, 2017

(30) Foreign Application Priority Data

Feb. 13, 2017 (CN) ...................... 2017 2 0128003 U

(51) Int. Cl.
*G02F 1/1362* (2006.01)

(52) U.S. Cl.
CPC .. *G02F 1/136286* (2013.01); *G02F 1/136227* (2013.01); *G02F 2001/136222* (2013.01)

(58) Field of Classification Search
CPC ......... G02F 1/136286; G02F 1/136227; G02F 2001/136222
See application file for complete search history.

(56) References Cited

U.S. PATENT DOCUMENTS

| | | | |
|---|---|---|---|
| 2014/0252321 A1* | 9/2014 | Pyon | H01L 27/3216 257/40 |
| 2015/0102292 A1* | 4/2015 | Kim | H01L 27/3246 257/40 |
| 2017/0059904 A1* | 3/2017 | Kim | G02F 1/1339 |

* cited by examiner

*Primary Examiner* — Dung Le
(74) *Attorney, Agent, or Firm* — Westman, Champlin & Koehler, P.A.

(57) ABSTRACT

Embodiments of the present disclosure provide an array substrate, a color filter substrate and a display panel. The array substrate includes: a base substrate; gate lines and data lines provided above the base substrate in a cross arrangement; and a plurality of pixel units defined by the gate lines and the data lines, each pixel unit including a pixel region and a non-pixel region. At least a portion of the gate line is located in the non-pixel region, a blocking wall region is formed in the non-pixel region and located between the portion of the gate line located in the non-pixel region and the pixel region, and a blocking wall structure for blocking movement of a spacer from the non-pixel region to the pixel region is formed in the blocking wall region.

19 Claims, 3 Drawing Sheets

ARRAY SUBSTRATE, COLOR FILTER SUBSTRATE AND DISPLAY PANEL

CROSS-REFERENCE TO RELATED APPLICATION

This application claims the benefit of the Chinese Patent Application No. 201720128003.2 filed on Feb. 13, 2017 in the State Intellectual Property Office of China, the whole disclosure of which is incorporated herein by reference.

TECHNICAL FIELD

Embodiments of the present disclosure generally relate to the field of display technology, and more particularly, to an array substrate, a color filter substrate and a display panel.

DESCRIPTION OF THE RELATED ART

Currently, a liquid crystal display (referred to as LCD for short) panel adopts spacers to maintain a uniformity of the thickness of liquid crystal cells of a display area of the panel. The liquid crystal display panel includes a display area and a peripheral non-display area, the display area including a pixel region and a non-pixel region. The pixel region is configured for performing image display, a gate line, a data line, a thin film transistor and the like which are configured for controlling the pixel region for displaying an image are provided in the non-pixel region, and the spacers are properly compressed and regularly arranged in the non-pixel region.

If the liquid crystal display panel is subjected to a large external force, an array substrate and a color filter substrate of the display panel will be moved relative to each other, and then the spacers will shift. The shifting of the spacers will scratch an alignment film on the side of the array substrate. Once the alignment film in the pixel region is scratched by the spacers, a light leakage will occur in the corresponding pixel region, that is, a bright spot (also known as a blue spot) will be presented in the pixel region, adversely affecting a display effect of the liquid crystal display panel.

In order to address this technical problem, in the prior art, a width or size of an cross section of a black matrix on the side of the color filter substrate is increased, that is, the area of the non-pixel region is increased and the area of the pixel region is reduced, so as to ensure that the spacers will never shift to the pixel region. However, the conventional technical solution of increasing the width or size of the cross section of the black matrix reduces an aperture ratio of a pixel unit, which is not advantageous for achieving a high resolution of the liquid crystal display panel.

SUMMARY

In order to overcome at least one of the above and other problems and defects in the prior arts, the present disclosure is proposed.

According to an aspect of the present disclosure, there is provided an array substrate, comprising:
a base substrate;
gate lines and data lines arranged above the base substrate in a cross arrangement; and
a plurality of pixel units defined by the gate lines and the data lines, each pixel unit comprising a pixel region and a non-pixel region,
wherein at least a portion of the gate line is located in the non-pixel region, and a blocking wall region is formed in the non-pixel region, the blocking wall region is located between the portion of the gate line located in the non-pixel region and the pixel region, and a blocking wall structure is formed in the blocking wall region to block a spacer from moving from the non-pixel region to the pixel region.

In an embodiment of the present disclosure, the gate line extends in a first direction, at least a portion of a side edge of the pixel region facing the gate line forms a first edge, and a distance between the first edge and the gate line is gradually increased in the first direction, and a side edge of the blocking wall structure facing the gate line has a portion which corresponds to the first edge and forms a second edge, and a distance between the second edge and the gate line is gradually increased in the first direction.

In an embodiment of the present disclosure, a groove region is provided at a side of the blocking wall region facing the gate line, a groove structure is provided in the groove region for guiding the spacer to move along the blocking wall structure, and the groove structure is located adjacent to and parallel to the blocking wall structure.

In an embodiment of the present disclosure, the array substrate further includes a thin film transistor located in the non-pixel region and a passivation layer disposed above the thin film transistor, the thin film transistor comprising a gate insulation layer disposed between the gate line and the data line; a first via hole for constituting the groove structure is formed in the gate insulation layer at a position corresponding to the groove region, and/or a second via hole for constituting the groove structure is formed in the passivation layer at a position corresponding to the groove region.

In an embodiment of the present disclosure, a stop structure for preventing a further movement of the spacer is provided at an end of the blocking wall structure away from the gate line.

In an embodiment of the present disclosure, the stop structure is integrally formed with the blocking wall structure.

In an embodiment of the present disclosure, an accommodating groove for releasing stress in the spacer is provided at a side of the stop structure facing the gate line.

In an embodiment of the present disclosure, a bottom of the accommodating groove is communicated to the base substrate.

In an embodiment of the present disclosure, the blocking wall structure has a linear, arc-shaped or triangular cross section.

In an embodiment of the present disclosure, a thin film transistor is provided in the non-pixel region and a pixel electrode is provided in the pixel region, the blocking wall structure comprises a raised structure disposed in the blocking wall region, and the raised structure comprises at least one of a first raised pattern, a second raised pattern, a third raised pattern and a fourth raised pattern, the first raised pattern is arranged in the same layer as a gate electrode of the thin film transistor, the second raised pattern is arranged in the same layer as an active layer of the thin film transistor, the third raised pattern is arranged in the same layer as a source/drain electrode layer of the thin film transistor, and the fourth raised pattern is arranged in the same layer as the pixel electrode.

In an embodiment of the present disclosure, the array substrate further includes a spacer located in the non-pixel region, wherein the spacer has a cross section in a shape of parallelogram or ellipse.

According to another aspect of the present disclosure, there is provided a color filter substrate for being assembled with the array substrate described in any embodiment of the present disclosure, the color filter substrate comprises a spacer, and the spacer has a cross section in a shape of parallelogram or ellipse.

In an embodiment of the present disclosure, the color filter substrate further includes a black matrix, which at least partially covers the non-pixel region after the color filter substrate and the array substrate are assembled into a cell; the gate line extends in a first direction, at least a portion of a side edge of the pixel region facing the gate line forms a first edge, and a distance between the first edge and the gate line is gradually increased in the first direction, and a side edge of the blocking wall structure facing the gate line has a portion which corresponds to the first edge and forms a second edge, and a distance between the second edge and the gate line is gradually increased in the first direction, and a width of a cross section of a portion of the black matrix located between the first edge and the gate line is gradually increased in the first direction.

According to another aspect of the present disclosure, there is provided a display panel, comprising the array substrate according to any one of the above embodiments of the present disclosure.

In an embodiment of the present disclosure, the display panel further includes a color filter substrate assembled with the array substrate into a cell, the color filter substrate comprises a spacer, and the spacer has a cross section in a shape of parallelogram or ellipse.

DETAILED DESCRIPTION OF PREFERRED EMBODIMENTS

In order to make the objectives, technical solutions and advantages of the present disclosure clearer, the present disclosure will now be further described in detail, with reference to the accompanying drawings. It will be apparent that the described embodiments are merely a part of the present disclosure, but not representative of all embodiments. All other embodiments obtained by those skilled in the art based on the described embodiments of the present disclosure without creative efforts fall within the scope of the present disclosure.

In addition, in the following detailed description, for purposes of explanation, numerous specific details are described in order to provide a thorough understanding of the disclosed embodiments. However, it will be apparent that one or more embodiments may also be implemented without these specific details. In other instances, well-known structures and devices are illustratively shown to simplify the drawings.

Figure 1:
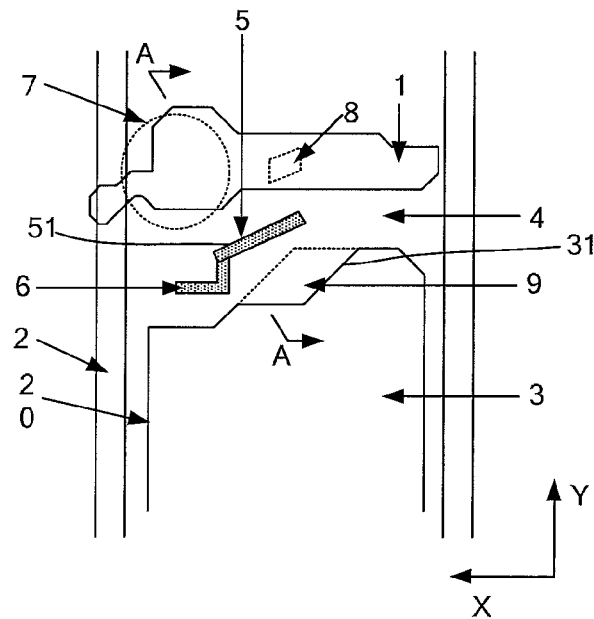
FIG. 1 is a top view of an array substrate according to an exemplary embodiment of the present disclosure.
Figure 2:
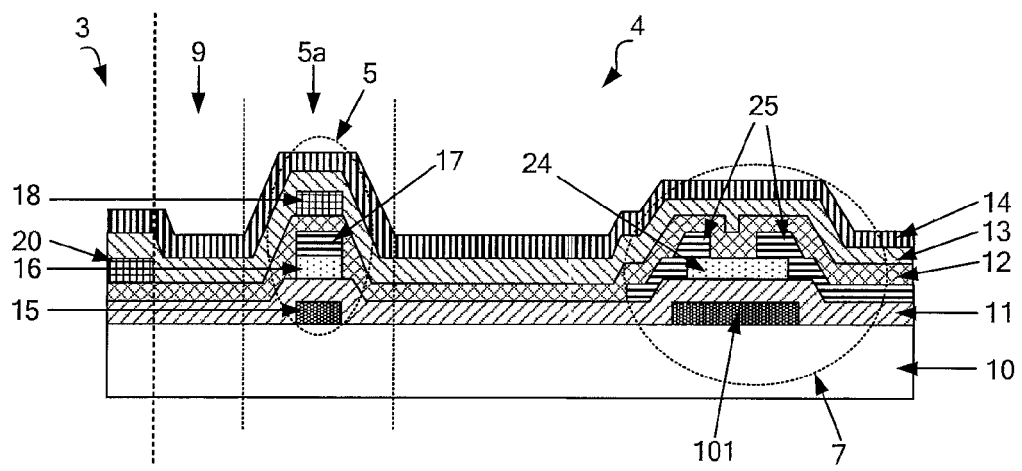
FIG. 2 is a schematic cross-sectional view taken along line A-A of FIG. 1 and showing a structure of the array substrate according to an exemplary embodiment of the present disclosure.

FIG. 1 is a top view of an array substrate according to an exemplary embodiment of the present disclosure, and FIG. 2 is a schematic cross-sectional view taken along line A-A of FIG. 1. As shown in FIGS. 1 and 2, the array substrate includes a base substrate 10 and gate lines 1 and data lines 2 disposed on the base substrate 10. The gate line 1 extends in a first direction (e.g., X direction), the data line 2 extends in a second direction (e.g., Y direction), and the gate line 1 and the data line 2 are disposed in a cross arrangement so as to define a plurality of pixel units. Each of the pixel units includes a pixel region 3 and a non-pixel region 4, at least a portion of the gate line 1 is located in the non-pixel region 4, and a blocking wall region 5a is formed in the non-pixel region 4, the blocking wall region 5a is located between the portion of the gate line 1 located in the non-pixel region 4 and the pixel region 3, for example, at a side of the non-pixel region 4 close to the pixel region 3, and a blocking wall structure 5 is formed in the blocking wall region 5a and configured for blocking movement or shift of a spacer from the non-pixel region 4 to the pixel region 3.

In some embodiments, after the array substrate is assembled with the color filter substrate, the spacer on the color filter substrate is made in contact with the array substrate and kept in a compressed state, and an orthographic projection 8 of the spacer on the array substrate or the other base substrate is located in the non-pixel region 4, for example, it is partially located in a region where the gate lines 1 are located or at other locations within the non-pixel region 4. In embodiments of the present disclosure, by providing the blocking wall structure 5 between a region corresponding to the gate line 1 and the pixel region 3, it can effectively block the movement or shift of the spacer from the non-pixel region 4 to the pixel region 3 when a relative displacement occurs between the array substrate and the color filter substrate, thereby preventing an alignment layer 14 in the pixel region 3 from being scratched.

It should be noted that, in the drawings, it is only exemplarily illustrated that the blocking wall structure 5 is only provided in a region between the grid line 1 and the pixel region 3 located at one side (a lower side as shown in FIG. 1) of the gate line 1. However, it will be appreciated by those skilled in the art that, in other embodiments, the blocking wall structure 5 may also be provided in a region between the grid line 1 and the pixel region at the other side (an upper side as shown in FIG. 1) of the grid line 1, or the blocking wall structure 5 may be provided at both sides of the grid line 1. These all fall within the scope of the present disclosure, and will not be described in detail herein.

In some embodiments, at least a portion of a side edge of the pixel region 3 facing the gate line 1 forms a first edge, and a distance between the first edge and the gate line 1 is gradually increased in the first direction, and a side edge of the blocking wall structure 5 facing the gate line 1 has a portion which corresponds to the first edge and forms a second edge, and a distance between the second edge and the gate line 1 is gradually increased in the first direction.

For example, in the embodiment shown in FIG. 1, the first direction is a horizontal direction X from right to left in the figure, and a second direction is a vertical direction Y from down to top in the figure. In such a situation, there is a partial edge (i.e., the first edge) 31 in the side edge of the pixel region 3 facing the gate line 1 in FIG. 1, and the distance between such an edge and the gate line 1 is gradually increased in the horizontal direction X from right to left, for example, the edge 31 is a curved edge or a stepped edge which is inclined from upper right side to lower left side in the figure. Meanwhile, there is an edge (i.e., the second edge) 51, which corresponds to the first edge, in the side edge of the blocking wall structure 5 facing the gate line 1, and the distance between the second edge and the gate line 1 is gradually increased in the horizontal direction X from right to left.

In some embodiments, a black matrix is provided to at least partially cover the non-pixel region, including a region between the pixel region and the gate line, the distance between the first edge in the side edge of the pixel region facing the gate line 1 and the gate line 1 is gradually increased in the first direction, and a width or size of a cross section of a portion of the black matrix located between the first edge and the gate line 1 is gradually increased in the first direction. Thus, by providing that the distance between the second edge in the blocking wall structure 5 corresponding to the first edge and the gate line 1 is gradually increased in the first direction, the second edge of the blocking wall structure 5 will guide the spacer to shift to a region where the width or size of the cross section of the black matrix is gradually increased if the spacer is made in contact with the blocking wall structure 5, thereby further avoiding the spacer from shifting to the pixel region 3.

In addition, since the spacer cannot be moved to a region 9 at a side of the blocking wall structure 5 facing away from the gate line 1 during the shift, the region 9 can be used as a portion the pixel region (for example, it is unnecessary to be covered by the black matrix). Thus, it can be seen that the embodiments of the present disclosure can effectively increase the size of the pixel region 3, thereby effectively improving an aperture ratio of the pixel unit.

Figure 3:
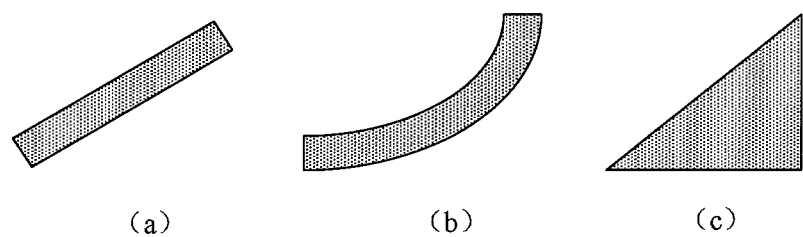
FIG. 3 is a schematic cross-sectional view of three different forms for a blocking wall structure according to an embodiment of the present disclosure.

FIG. 3 is a schematic cross-sectional view of three different forms of a blocking wall structure according to an embodiment of the present disclosure. As shown in FIG. 3, the cross section of the blocking wall structure 5 or an orthographic projection of the blocking wall structure 5 on the base substrate is linear (see FIG. 3 (*a*)), arc-shaped (see FIG. 3 (*b*)) or triangular (see FIG. 3 (*c*)). It should be noted that, in practical applications, the shape of the blocking wall structure 5 may be accordingly adjusted according to the shape of the pixel region, so that the blocking wall structure 5 can guide the spacer to shift to the region where the width or size of the cross section of the black matrix is gradually increased. These all fall within the scope of the present disclosure.

In some embodiments, a thin film transistor 7 is formed above the base substrate 10 and in the non-pixel region 4, a gate electrode 101 of the thin film transistor 7 is electrically connected to the gate line 1 (e.g., through a through hole in an interlayer insulation layer), a gate insulation layer 11 is formed between the gate electrode 101 and an active layer 24 of the thin film transistor 7 and disposed on the whole base substrate 10, a passivation layer 12 is formed above the thin film transistor 7 and disposed over the whole base substrate 10, a pixel electrode 20 is formed on the passivation layer 12 and in the pixel region, a protection layer 13 is formed above the pixel electrode 20 and disposed over the whole base substrate 10, and an alignment layer 14 is formed on the protection layer 13 and disposed over the whole base substrate 10.

In some embodiments of the present disclosure, the blocking wall structure 5 comprises a raised structure 5*a* disposed in the blocking wall region, and the raised structure comprises at least one of a first raised pattern 15, a second raised pattern 16, a third raised pattern 17 and a fourth raised pattern 18, for example, as shown in FIG. 2. In some examples, the first raised pattern 15 is arranged in the same layer as the gate electrode 101, the second raised pattern 16 is arranged in the same layer as the active layer 24 of the thin film transistor 7, the third raised pattern 17 is arranged in the same layer as a source/drain electrode layer 25 of the thin film transistor 7, and the fourth raised pattern 18 is arranged in the same layer as the pixel electrode 20. Illustratively, "arranged in the same layer" may mean that, for example, two components/layers are formed from a same material layer, or the two components/layers are directly in a same layer, which are not limited herein.

In the illustrated embodiment, the raised structure including the first raised pattern 15, the second raised pattern 16, the third raised pattern 17 and the fourth raised pattern 18 is taken as an example. As shown in FIG. 2, the first raised pattern 15, the second raised pattern 16, the third raised pattern 17 and the fourth raised pattern 18 are provided in the blocking wall region 5*a* so that the total height of film layers in the blocking wall region 5*a* is increased (e.g., relative to either side of the blocking wall region 5*a*). In this way, the blocking wall region 5*a* is constituted by the first raised pattern 15, a portion of the gate insulation layer 11 located in the blocking wall region 5*a*, the second raised pattern 16, the third raised pattern 17, a portion of the passivation layer 12 located in the blocking wall region 5*a*, the fourth raised pattern 18, a portion of the protection layer 13 located in the blocking wall region 5*a* and a portion of the alignment layer 14 located in the blocking wall region 5*a*.

In some embodiments of the present disclosure, since the first raised pattern 15 is arranged in the same layer as the gate electrode 101, the first raised pattern 15 and the gate electrode 101 may be manufactured simultaneously by a single patterning process; since the second raised pattern 16 is arranged in the same layer as the active layer 24 of the thin film transistor 7, the second raised pattern 16 and the active layer 24 may be manufactured simultaneously by a single patterning process; since the third raised pattern 17 is arranged in the same layer as the source/drain electrode layer 25 of the thin film transistor 7, the third raised pattern 17 and the source/drain electrode layer 25 may be manufactured simultaneously by a single patterning process; since the fourth raised pattern 18 is arranged in the same layer as the pixel electrode 20, the fourth raised pattern 18 and the pixel electrode 20 may be manufactured simultaneously by a single patterning process. Thus, it can be seen that the number of process steps can be effectively reduced in the manufacturing of the array substrate according to the embodiments of the present disclosure.

It should be noted that the above raised structure including the first raised pattern 15, the second raised pattern 16, the third raised pattern 17 and the fourth raised pattern 18 is only described as an exemplary embodiment of the present disclosure. It is possible to make a height of the blocking wall structure 5 on the array substrate sufficiently high and make the blocking effect better, without changing the conventional array substrate manufacturing process. It will be apparent that, in the present disclosure, the raised structure may only include one, two or three of the first raised pattern 15, the second raised pattern 16, the third raised pattern 17 and the fourth raised pattern 18. In addition, it is possible to independently provide a raised structure above the alignment layer 14 and in the blocking wall region, so as to constitute the blocking wall structure 5 along with the film layers below. The detailed cases will not be described in detail herein.

In an embodiment, as shown in FIG. 1, a stop structure 6 for limiting a further movement of the spacer is provided at an end of the blocking wall structure 5 away from the gate line. Exemplarily, the cross section of the stop structure 6 or an orthographic projection of the stop structure 6 on the base substrate is substantially "L"-shaped or "U"-shaped. When the spacer moves to the stop structure 6 along the blocking wall structure 5, the stop structure 6 prevents further movement of the spacer so as to avoid defects due to excessive shift of the spacer.

In an embodiment, the stop structure 6 is integrally formed with the blocking wall structure 5. Exemplarily, the stop structure 6 is connected to the blocking wall structure 5, they may be composed of a same film layer structure, or alternatively, their adjacent ends may be stacked or overlapped with each other.

Figure 4:
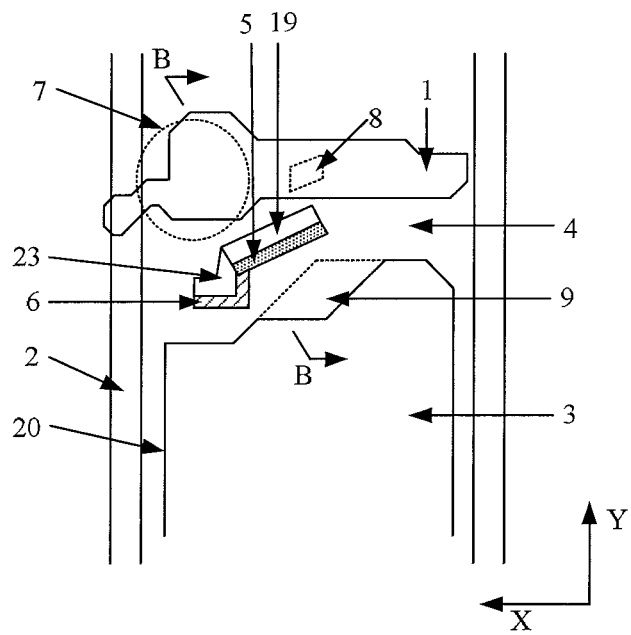
FIG. 4 is a top view of an array substrate according to another exemplary embodiment of the present disclosure.
Figure 5:
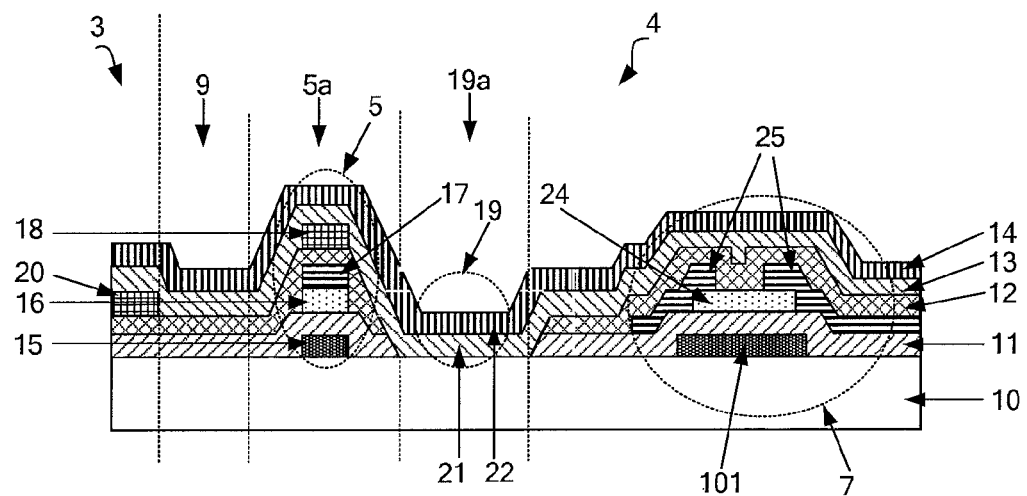
FIG. 5 is a schematic cross-sectional view taken along line B-B of FIG. 4 and showing a structure of the array substrate according to the another exemplary embodiment of the present disclosure.

FIG. 4 is a top view of an array substrate according to another exemplary embodiment of the present disclosure, and FIG. 5 is a schematic cross-sectional view taken along line B-B of FIG. 4. As shown in FIGS. 4 and 5, the array substrate is substantially similar to the array substrate described in the above embodiments, so the same or similar structures are indicated by the same reference numerals and will not be described in detail herein. The embodiment shown in FIGS. 4 and 5 differs from the above embodiments in that the array substrate in FIGS. 4 and 5 further includes a groove structure 19 in a groove region 19a located at a side of the blocking wall region 5a facing the gate line 1, in addition to the blocking wall structure 5 and the stop structure 6 described in the above embodiments. The groove structure 19 is configured for guiding the spacer to move along the blocking wall structure 5 when the spacer shifts. In an example, the groove structure 19 is located adjacent to and parallel to the blocking wall structure 5, for example, an extending direction of the groove structure is substantially the same as an extending direction of the blocking wall structure.

In the embodiment of the present disclosure, by providing the groove structure 19 at a side edge of the blocking wall structure 5 facing the gate line 1, the groove structure 19 can more effectively guide the spacer to move along the blocking wall structure 5 when the spacer shifts. In addition, when the spacer is in the groove structure 19, a part of stress in the spacer may be released, thereby effectively avoiding the spacer from being damaged by excessive stress.

In some embodiments, in order to form the above-described groove structure 19, optionally, a first via hole 21 for constituting the groove structure 19 is formed in the gate insulation layer 11 at a position corresponding to the groove region 19a, and/or a second via hole 22 for constituting the groove structure 19 is formed in the passivation layer 12 at a position corresponding to the groove region 19a. Portions of the protection layer 13 and the alignment layer 14 located within the groove region 19a are recessed and positioned in the first via hole 21 and/or the second via hole 22, to form the groove structure 19.

In general, in manufacturing of the gate insulation layer 11, it is generally required to provide connection via holes corresponding to a common electrode line and a metal pad (used as an end of a storage capacitor) in the gate insulation layer 11 by a patterning process. In order to avoid adding additional steps, in an embodiment of the present disclosure, the first via hole 21 and the connection via hole may be formed by a single patterning process.

In addition, it is generally required to provide a via hole in the passivation layer 12 for electrically connecting the pixel electrode to a drain electrode. In order to avoid adding additional steps, in an embodiment of the present disclosure, this via hole and the second via hole 22 may be formed by a single patterning process.

It should be noted that, in the drawings, it is only exemplarily illustrated that the first via hole 21 and the second via hole 22 are formed in the groove region 19a, but the present disclosure is not limited thereto, and in other embodiments, it may be also possible to provide only the first via hole 21 or the second via hole 22. In addition, in other embodiments of the present disclosure, a corresponding via hole may also be formed in at least one of the protection layer 13 and the alignment layer 14 at a position corresponding to the groove region by an additional process, so as to form the groove structure 19.

In an embodiment of the present disclosure, an accommodating groove 23 for releasing the stress in the spacer is provided at a side of the stop structure 6 facing the gate line 1. The arrangement of the accommodating recess 23 may not only cooperate with the stop structure 6 to prevent the movement or shift of the spacer, but also effectively release the stress in the spacer. In an example, a bottom of the accommodating groove 23 is communicated to the base substrate 10. In this way, the stress in the spacer can be released to the greatest extent.

In some examples, after the process of manufacturing the array substrate is ended, various film layers in a region where the accommodating groove 23 is located may be removed by an etching process, such that the bottom of the accommodating groove 23 is communicated to the base substrate 10 or a portion of the base substrate 10 is exposed through the accommodating groove 23.

Figure 6:
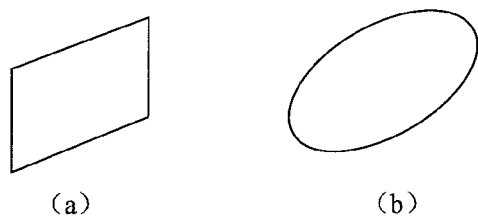
FIG. 6 is a schematic cross-sectional view of two different forms for a spacer according to an embodiment of the present disclosure.

In an embodiment of the present disclosure, there is further provided a color filter substrate for cooperating with the array substrate described in any of the above embodiments, and the color filter substrate comprises a spacer. FIG. 6 is a schematic cross-sectional view of two different forms of a spacer according to an embodiment of the present disclosure. As shown in FIG. 6, a cross section of the spacer or an orthographic projection of the spacer on the base substrate may be in a shape of parallelogram or ellipse. In the embodiment of the present disclosure, if the cross section of the spacer is in a shape of parallelogram (see FIG. 6 (a)) or ellipse (see FIG. 6 (b)), a contact area between the spacer and the blocking wall structure may be effectively increased, thus it can more effectively guide the spacer along the edge of the blocking wall structure to move, thereby preventing the spacer from passing across the blocking wall structure into the pixel region.

In some embodiments, the black matrix may also be formed or disposed on the color filter substrate, and may at least partially cover the non-pixel region after the color filter substrate and the array substrate are assembled into a cell. In other embodiments, the spacers may also be formed or disposed on the array substrate, for example, some spacers are located in the non-pixel region, and after the color filter substrate and the array substrate are assembled into a cell, the spacers are positioned between the color filter substrate and the array substrate to maintain a predetermined distance or gap therebetween.

In an embodiment of the present disclosure, there is further provided a display panel, comprising the array substrate according to any one of the above embodiments. In an example, the display panel includes a liquid crystal display panel.

In an embodiment, the display panel further comprises the color filter substrate described in any of the above embodiments.

The embodiments of the present disclosure provide an array substrate, a color filter substrate and a display panel. The array substrate includes: a base substrate; gate lines and data lines provided above the base substrate in a cross arrangement; and a plurality of pixel units defined by the gate lines and the data lines, each pixel unit including a pixel region and a non-pixel region. A blocking wall region is formed in the non-pixel region, the blocking wall region is located between a region corresponding to the gate line and the pixel region, and a blocking wall structure for blocking movement of a spacer from the non-pixel region to the pixel region is formed in the blocking wall region, so as to effectively block the spacer from moving from the non-pixel region to the pixel region when the spacer shifts. In some embodiments, at least a portion of a side edge of the pixel region facing the gate line forms a first edge, and a distance between the first edge and the gate line is gradually increased in the first direction, and a side edge of the blocking wall structure facing the gate line has a portion which corresponds to the first edge and forms a second edge, and a distance between the second edge and the gate line is gradually increased in the first direction. The second edge of the blocking wall structure may guide the spacer to shift to a region where the width or size of the cross section of the black matrix is gradually increased, thereby further avoiding the spacer from shifting to the pixel region.

It should be understood that the above embodiments are merely exemplary embodiments for the purpose of explaining the principle of the present disclosure, however, the present disclosure is not limited thereto. It will be apparent to those skilled in the art that various changes and modifications can be made thereto without departing from the spirit and principle of the present disclosure, and such changes and modifications also fall within the scope of the present disclosure.

What is claimed is:

1. An array substrate, comprising:
   a base substrate;
   gate lines and data lines arranged above the base substrate in a cross arrangement; and
   a plurality of pixel units defined by the gate lines and the data lines, each pixel unit comprising a pixel region and a non-pixel region,
   wherein at least a portion of the gate line is located in the non-pixel region, and a blocking wall region is formed in the non-pixel region, the blocking wall region is located between the portion of the gate line located in the non-pixel region and the pixel region, and a blocking wall structure is formed in the blocking wall region to block a spacer from moving from the non-pixel to the pixel region,
   wherein a groove region is provided at a side of the blocking wall region facing the gate line, a groove structure is provided in the groove region for guiding the spacer to move along the blocking wall structure, and the groove structure is located adjacent to and parallel to the blocking wall structure.

2. The array substrate according to claim 1, wherein the gate line extends in a first direction, at least a portion of a side edge of the pixel region facing the gate line forms a first edge, and a distance between the first edge and the gate line is gradually increased in the first direction, and a side edge of the blocking wall structure facing the gate line has a portion which corresponds to the first edge and forms a second edge, and a distance between the second edge and the gate line is gradually increased in the first direction.

3. The array substrate according to claim 1, further comprising a thin film transistor located in the non-pixel region and a passivation layer disposed above the thin film transistor, the thin film transistor comprising a gate insulation layer disposed between the gate line and the data line,
   wherein a first via hole for constituting the groove structure is formed in the gate insulation layer at a position corresponding to the groove region, and/or a second via hole for constituting the groove structure is formed in the passivation layer at a position corresponding to the groove region.

4. The array substrate according to claim 2, wherein a stop structure for preventing a further movement of the spacer is provided at an end of the blocking wall structure away from the gate line.

5. The array substrate according to claim 4, wherein the stop structure is integrally formed with the blocking wall structure.

6. The array substrate according to claim 4, wherein an accommodating groove for releasing stress in the spacer is provided at a side of the stop structure facing the gate line.

7. The array substrate according to claim 6, wherein a bottom of the accommodating groove is communicated to the base substrate.

8. The array substrate according to claim 2, wherein the blocking wall structure has a linear, arc-shaped or triangular cross section.

9. The array substrate according to claim 1, wherein a thin film transistor is provided in the non-pixel region and a pixel electrode is provided in the pixel region, the blocking wall structure comprises a raised structure disposed in the blocking wall region, and the raised structure comprises at least one of a first raised pattern, a second raised pattern, a third raised pattern and a fourth raised pattern,
   wherein the first raised pattern is arranged in the same layer as a gate electrode of the thin film transistor;
   the second raised pattern is arranged in the same layer as an active layer of the thin film transistor;
   the third raised pattern is arranged in the same layer as a source/drain electrode layer of the thin film transistor; and
   the fourth raised pattern is arranged in the same layer as the pixel electrode.

10. The array substrate according to claim 2, wherein a thin film transistor is provided in the non-pixel region and a pixel electrode is provided in the pixel region, the blocking wall structure comprises a raised structure disposed in the blocking wall region, and the raised structure comprises at least one of a first raised pattern, a second raised pattern, a third raised pattern and a fourth raised pattern,
   wherein the first raised pattern is arranged in the same layer as a gate electrode of the thin film transistor;
   the second raised pattern is arranged in the same layer as an active layer of the thin film transistor;
   the third raised pattern is arranged in the same layer as a source/drain electrode layer of the thin film transistor; and
   the fourth raised pattern is arranged in the same layer as the pixel electrode.

11. The array substrate according to claim 1, wherein a thin film transistor is provided in the non-pixel region and a pixel electrode is provided in the pixel region, the blocking wall structure comprises a raised structure disposed in the blocking wall region, and the raised structure comprises at least one of a first raised pattern, a second raised pattern, a third raised pattern and a fourth raised pattern, wherein the first raised pattern is arranged in the same layer as a gate electrode of the thin film transistor;

the second raised pattern is arranged in the same layer as an active layer of the thin film transistor;

the third raised pattern is arranged in the same layer as a source/drain electrode layer of the thin film transistor; and the fourth raised pattern is arranged in a same layer as the pixel electrode.

12. The array substrate according to claim 3, wherein a thin film transistor is provided in the non-pixel region and a pixel electrode is provided in the pixel region, the blocking wall structure comprises a raised structure disposed in the blocking wall region, and the raised structure comprises at least one of a first raised pattern, a second raised pattern, a third raised pattern and a fourth raised pattern, wherein the first raised pattern is arranged in the same layer as a gate electrode of the thin film transistor;

the second raised pattern is arranged in the same layer as an active layer of the thin film transistor;

the third raised pattern is arranged in the same layer as a source/drain electrode layer of the thin film transistor; and the fourth raised pattern is arranged in the same layer as the pixel electrode.

13. The array substrate according to claim 4, wherein a thin film transistor is provided in the non-pixel region and a pixel electrode is provided in the pixel region, the blocking wall structure comprises a raised structure disposed in the blocking wall region, and the raised structure comprises at least one of a first raised pattern, a second raised pattern, a third raised pattern and a fourth raised pattern, wherein the first raised pattern is arranged in the same layer as a gate electrode of the thin film transistor;

the second raised pattern is arranged in the same layer as an active layer of the thin film transistor;

the third raised pattern is arranged in a same layer as the source/drain electrode layer of the thin film transistor; and the fourth raised pattern is arranged in the same layer as the pixel electrode.

14. The array substrate according to claim 6, wherein a thin film transistor is provided in the non-pixel region and a pixel electrode is provided in the pixel region, the blocking wall structure comprises a raised structure disposed in the blocking wall region, and the raised structure comprises at least one of a first raised pattern, a second raised pattern, a third raised pattern and a fourth raised pattern, wherein the first raised pattern is arranged in the same layer as a gate electrode of the thin film transistor;

the second raised pattern is arranged in the same layer as an active layer of the thin film transistor;

the third raised pattern is arranged in the same layer as a source/drain electrode layer of the thin film transistor; and the fourth raised pattern is arranged in the same layer as the pixel electrode.

15. The array substrate according to claim 1, further comprising a spacer located in the non-pixel region, wherein the spacer has a cross section in a shape of parallelogram or ellipse.

16. A color filter substrate for being assembled with the array substrate according to claim 1 into a cell, wherein the color filter substrate comprises a spacer, and the spacer has a cross section in a shape of parallelogram or ellipse.

17. The color filter substrate according to claim 16, further comprising a black matrix, which at least partially covers the non-pixel region after the color filter substrate and the array substrate are assembled into a cell, wherein the gate line extends in a first direction, at least a portion of a side edge of the pixel region facing the gate line forms a first edge, and a distance between the first edge and the gate line is gradually increased in the first direction, and a side edge of the blocking wall structure facing the gate line has a portion which corresponds to the first edge and forms a second edge, and a distance between the second edge and the gate line is gradually increased in the first direction, and a width of a cross section of a portion of the black matrix located between the first edge and the gate line is gradually increased in the first direction.

18. A display panel, comprising the array substrate according to claim 1.

19. The display panel according to claim 18, further comprising a color filter substrate assembled with the array substrate into a cell, wherein the color filter substrate comprises a spacer, and the spacer has a cross section in a shape of parallelogram or ellipse.

* * * * *